(12) United States Patent
Cheng et al.

(10) Patent No.: US 8,591,825 B2
(45) Date of Patent: Nov. 26, 2013

(54) EXTRACTION APPARATUS

(75) Inventors: Chen-Hsi Cheng, Hsinchu (TW);
 Chung-Cheng Han, Taipei (TW);
 Tz-Bang Du, Yilan County (TW);
 Yun-Huin Lin, Hsinchu (TW); Hom-Ti Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 176 days.

(21) Appl. No.: 13/213,089

(22) Filed: Aug. 19, 2011

(65) Prior Publication Data

US 2012/0294777 A1    Nov. 22, 2012

(30) Foreign Application Priority Data

May 18, 2011    (TW) .............................. 100117418 A (51) Int. Cl.
| | | |
|---|---|---|
| B01D 11/04 | (2006.01) | |
| B01D 11/00 | (2006.01) | |
| C02F 1/26 | (2006.01) | |
| C02F 1/44 | (2006.01) | |
| C12C 1/15 | (2006.01) | |
| C12C 7/06 | (2006.01) | |

(52) U.S. Cl.
USPC ........... 422/259; 422/255; 422/258; 210/634; 435/291.3

(58) Field of Classification Search
USPC ......... 422/255, 258–259; 435/291.3; 210/634
See application file for complete search history.

(56) References Cited

U.S. PATENT DOCUMENTS

| | | |
|---|---|---|
| 3,258,964 A | 7/1966 | Zessoules |
| 5,330,913 A | 7/1994 | Nakayama |
| 5,362,895 A | 11/1994 | Engelhardt et al. |
| 5,539,133 A | 7/1996 | Kohn et al. |
| 5,951,875 A | 9/1999 | Kanel et al. |
| 6,166,231 A | 12/2000 | Hoeksema |

(Continued)

FOREIGN PATENT DOCUMENTS

| | | |
|---|---|---|
| CN | 1241149 | 1/2000 |
| CN | 1408263 | 4/2003 |

(Continued)

OTHER PUBLICATIONS

M. Cygnarowicz-Provost et al., "Supercritical-Fluid Extraction of Fungal Lipids: Effect of Cosolvent on Mass-Transfer Rates and Process Design and Economics", The Journal of Supercritical Fluids, 1995, 8, p. 51-59.

(Continued)

*Primary Examiner* — Walter D Griffin
*Assistant Examiner* — Christopher Vandeusen
(74) *Attorney, Agent, or Firm* — Jianq Chyun IP Office (57) ABSTRACT

An extraction apparatus capable of continuously and efficiently extracting a biological substance is provided. Multiple rotation discs are utilized in the extraction apparatus to significantly improve the efficiency of extracting the biological substance by using an extraction solvent. Specifically, when the extraction solvent is applied to extract lipids from microalgae, retention time of the microalgae in the extraction solvent can be significantly increased, and solubility of the microalgal lipids in the extraction solvent can be improved. Hence, the efficiency of extracting the lipids from the microalgae by using the extraction solvent can be enhanced. On the other hand, owing to the improvement of the efficiency of extracting the lipids from the microalgae, the amount of the extraction solvent can be reduced, and production costs can be reduced as well.

20 Claims, 8 Drawing Sheets

(56) References Cited

U.S. PATENT DOCUMENTS

| | | |
|---|---|---|
| 6,405,984 B1 | 6/2002 | Simons et al. |
| 6,812,001 B2 | 11/2004 | Sibeijn et al. |
| 7,063,855 B2 | 6/2006 | Hjaltason et al. |
| 7,226,771 B2 | 6/2007 | Gramatikova et al. |
| 7,371,343 B2 | 5/2008 | Kim |
| 7,396,548 B2 | 7/2008 | Kyle |
| 7,648,635 B2 | 1/2010 | Seidlitz et al. |
| 2002/0025548 A1 | 2/2002 | Sibeyn et al. |
| 2002/0055135 A1 | 5/2002 | Sibeijn et al. |
| 2003/0150804 A1* | 8/2003 | Haubs et al. ................. 210/634 |
| 2007/0003686 A1 | 1/2007 | Fichtali et al. |
| 2007/0196894 A1 | 8/2007 | Sim et al. |
| 2008/0038290 A1 | 2/2008 | Renimel et al. |
| 2008/0220515 A1 | 9/2008 | McCall |
| 2008/0226740 A1 | 9/2008 | Chen et al. |
| 2009/0298158 A1 | 12/2009 | Thomas et al. |
| 2009/0324799 A1 | 12/2009 | Hartman et al. |
| 2010/0041926 A1 | 2/2010 | Kang et al. |
| 2010/0080761 A1 | 4/2010 | Herrmann et al. |
| 2010/0124774 A1 | 5/2010 | Kim et al. |
| 2010/0143267 A1 | 6/2010 | Pertile et al. |
| 2010/0204315 A1 | 8/2010 | Okino et al. |
| 2010/0236137 A1 | 9/2010 | Wu et al. |
| 2010/0261918 A1 | 10/2010 | Chianelli et al. |
| 2010/0261922 A1 | 10/2010 | Fleischer et al. |
| 2010/0304452 A1 | 12/2010 | Oyler |
| 2011/0147305 A1* | 6/2011 | Marlow et al. ................. 210/634 |

FOREIGN PATENT DOCUMENTS

| | | |
|---|---|---|
| CN | 1448383 | 10/2003 |
| CN | 1544413 | 11/2004 |
| CN | 101352249 | 1/2009 |
| CN | 101368193 | 2/2009 |
| CN | 101445496 | 6/2009 |
| CN | 101485973 | 7/2009 |
| CN | 101648955 | 2/2010 |
| CN | 101736045 | 6/2010 |
| CN | 101747924 | 6/2010 |
| CN | 101748053 | 6/2010 |
| CN | 101750460 | 6/2010 |
| CN | 101774956 | 7/2010 |
| CN | 101802206 | 8/2010 |
| EP | 1197218 | 4/2002 |
| JP | 60207567 | 10/1985 |
| JP | 06106002 A * | 4/1994 ............ B01D 11/04 |
| TW | 200526713 | 8/2005 |
| TW | 200904975 | 2/2009 |
| TW | 200948390 | 12/2009 |
| TW | I322186 | 3/2010 |
| TW | 201019943 | 6/2010 |
| TW | 201041638 | 12/2010 |
| WO | 2010090590 | 8/2010 |

OTHER PUBLICATIONS

P. Vauchel et al., "A New Process for Extracting Alginates from Laminaria digitata: Reactive Extrusion", Food and Bioprocess Technology, Sep. 2008, vol. 1, No. 3: p. 1-6.

A. Gimenez et al., "Downstream processing and purification of eicosapentaenoic (20:5n-3) and arachidonic acids (20:4n-6) from the microalga *Porphyridium cruentum*", Bioseparation 7, 1998, p. 89-99.

R. Halim et al., "Oil extraction from microalgae for biodiesel production" Bioresource Technology, 2010, p. 1-33.

R. Eggers, "Large-Scale Industrial Plant for Extraction with Supercritical Gases", Angew. Chem. Int. Ed. Engl., 17, 1978, p. 751-754.

"Notice of Allowance of Taiwan Counterpart Application", issued on Sep. 23, 2013, p1-p4.

* cited by examiner

EXTRACTION APPARATUS

CROSS-REFERENCE TO RELATED APPLICATION

This application claims the priority benefit of Taiwan application serial no. 100117418, filed May 18, 2011. The entirety of the above-mentioned patent application is hereby incorporated by reference herein and made a part of this specification.

TECHNICAL FIELD

The disclosure relates to an extraction apparatus for extracting a biological substance.

BACKGROUND

Microalgae are one of the biological energy sources that have the potential to be developed. Microalgal lipids are sealed in cells and can be secreted from the cells by applying the developing gene and metabolic engineering technologies. In addition, it is feasible to rupture the cell wall of the microalgae and extract the lipids from the microalgae. Whether the microalgae can be the mainstream alternative energy source rests in the possibility of improving the extraction efficiency and the performance of extracting the lipids from the microalgae.

Extraction of the lipids from the microalgae is one of the liquid-solid extraction techniques and is achieved by means of a solvent. However, the solid microalgae are small, and after the cell walls of the microalgae are ruptured is 50 by weight at least. Hence, the solvent (e.g., hexane) that is not apt to be dissolved in the water is applied for liquid-solid extraction. On the other hand, when the solvent (e.g., methanol) having the similar polarity to that of the water is utilized for liquid-solid extraction, the solvent needs to be at least twice the microalgae, and thus the costs on separation of the solvent from the microalgae are rather high.

SUMMARY

The disclosure is directed to an extraction apparatus in which an extraction solvent is applied to extract a biological substance in an efficient manner. For instance, when the extraction apparatus is applied to extract lipids from the microalgae, retention time between the microalgal lipids and the extraction solvent can be significantly increased, solubility of the microalgal lipids in the extraction solvent can be improved, and an impact of the water content of the microalgae on the extraction of the lipids from the microalgae can be lessened. Hence, the efficiency of extracting the lipids from the microalgae by using the extraction solvent can be enhanced.

Specifically, the extraction apparatus described in the exemplary embodiments of the disclosure has a chamber and includes a shaft, a plurality of rotation discs, a biological substance feeding entrance, an extraction solvent injection entrance, an extract outlet, a raffinate outlet, and a depositor. The shaft has a first end and a second end. The first end is adjacent to a top of the chamber, and the second end is adjacent to a bottom of the chamber. The rotation discs are juxtaposed at the first end of the shaft, and each of the rotation discs has at least one opening. The biological substance feeding entrance is located at the top of the chamber for introducing a biological substance to the opening of the uppermost rotation disc, such that the biological substance moves downward and sequentially passes through the opening of each of the rotation discs. The extraction solvent injection entrance located is at the bottom of the chamber. An extraction solvent is injected into the chamber through the extraction solvent injection entrance, such that the extraction solvent and the biological substance are reversely contacted to generate an extract and a raffinate. The extract outlet is located at the top of the chamber for discharging the extract. The raffinate outlet is located at the bottom of the chamber for discharging the raffinate. The depositor is configured at the second end of the shaft for collecting the raffinate and discharging the raffinate from the chamber through the raffinate outlet.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this disclosure. The drawings illustrate embodiments of the disclosure and, together with the description, serve to explain the principles of the disclosure.

DESCRIPTION OF EMBODIMENTS

Figure 1:
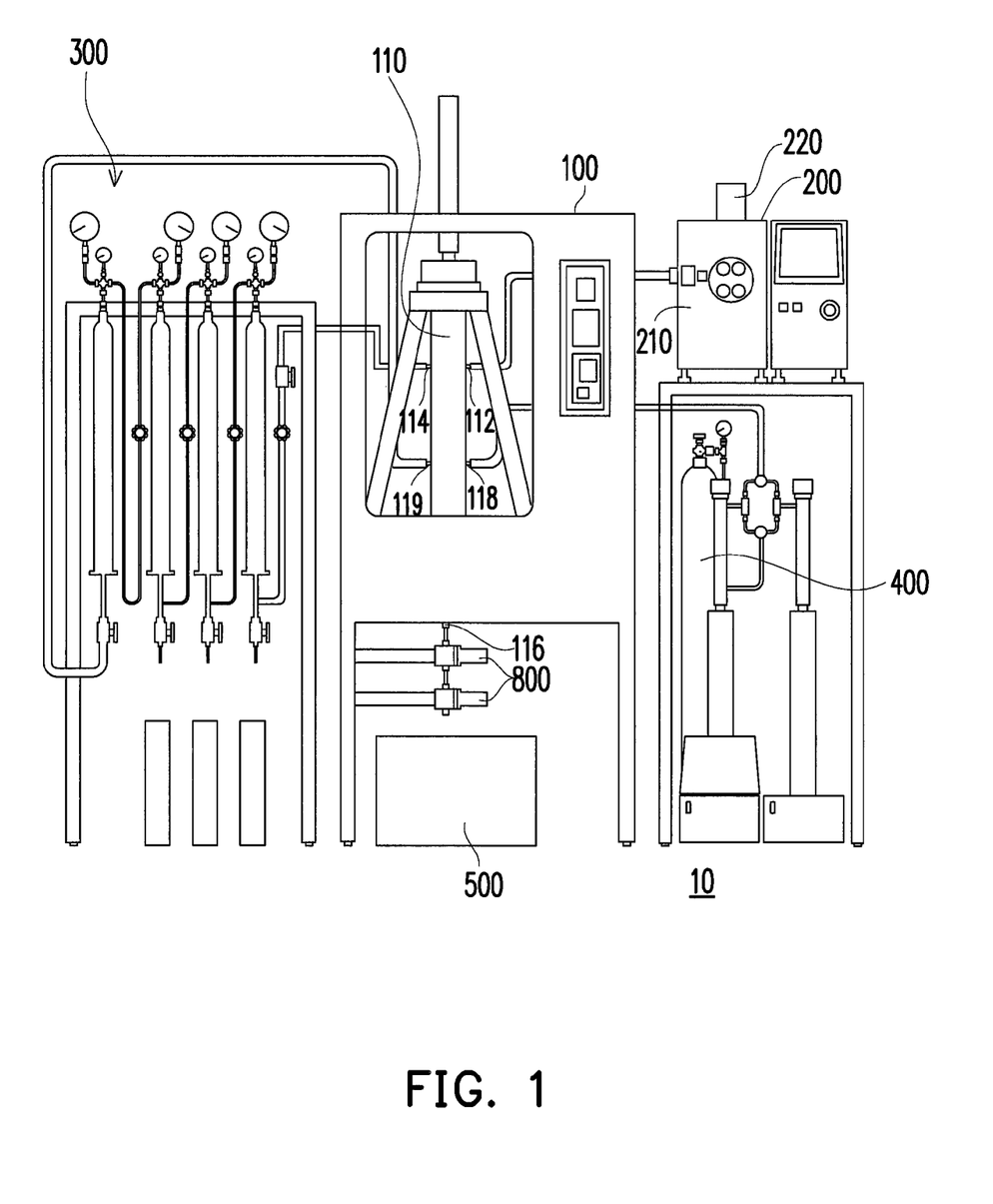
FIG. 1 illustrates an extraction apparatus according to an exemplary embodiment of the disclosure.

FIG. 1 illustrates an extraction apparatus according to an exemplary embodiment of the disclosure. As indicated in FIG. 1, the extraction apparatus 10 of this exemplary embodiment includes the extraction unit 100, a feed unit 200, and a separation unit 300. The extraction unit 100 has a chamber 110. A biological substance feeding entrance 112 and an extract outlet 114 are located at the top of the chamber 110, and a raffinate outlet 116 and an extraction solvent injection entrance 118 are located at the bottom of the chamber 110.

The feed unit 200 is connected to the biological substance feeding entrance 112, so as to provide the chamber 110 with the biological substance. In this exemplary embodiment, the feed unit 200 can include a cell rupture apparatus, such as a high-pressure homogenizer 210 or a ball miller, as shown in FIG. 1, so as to rupture the cell wall of the biological substance. Thereby, the cell wall of the biological substance is not capable of interrupting the extraction. The biological substance is injected into the high-pressure homogenizer 210 through a feed 220. In addition, a cell rupture reagent can be selectively added to the feed unit 200, so as to facilitate the cell rupture of the biological substance. In addition to the high-pressure homogenizer 210, an extruder can also be utilized in the feed unit 200 for discharging the biological substance to the biological substance feeding entrance 112.

The extraction solvent is stored in an extraction solvent storage unit 400, and the extraction solvent is injected into the chamber 110 of the extraction unit 100 through the extraction solvent injection entrance 118. A residue discharge valve 800 can be configured below the chamber 110 and connected to the raffinate outlet 116 that is located at the bottom of the chamber 110 for controlling the action of discharging the raffinate. A raffinate container 500 is placed below the extraction unit 100 for collecting the raffinate discharged from the raffinate outlet 116.

The separation unit 300 is connected to the extract outlet 114 for separating the extract from the extraction solvent and then collecting the extract and the extraction solvent. The separation unit 300 described in the exemplary embodiment of the disclosure can separate and recycle the extraction solvent due to the changeable solubility of the extract in the extraction solvent under different temperature or pressure, and the extraction solvent is re-introduced into the chamber 110 of the extraction unit 100 through another extraction solvent injection outlet 119. Thereby, the amount of the extraction solvent can be reduced.

Figure 2:
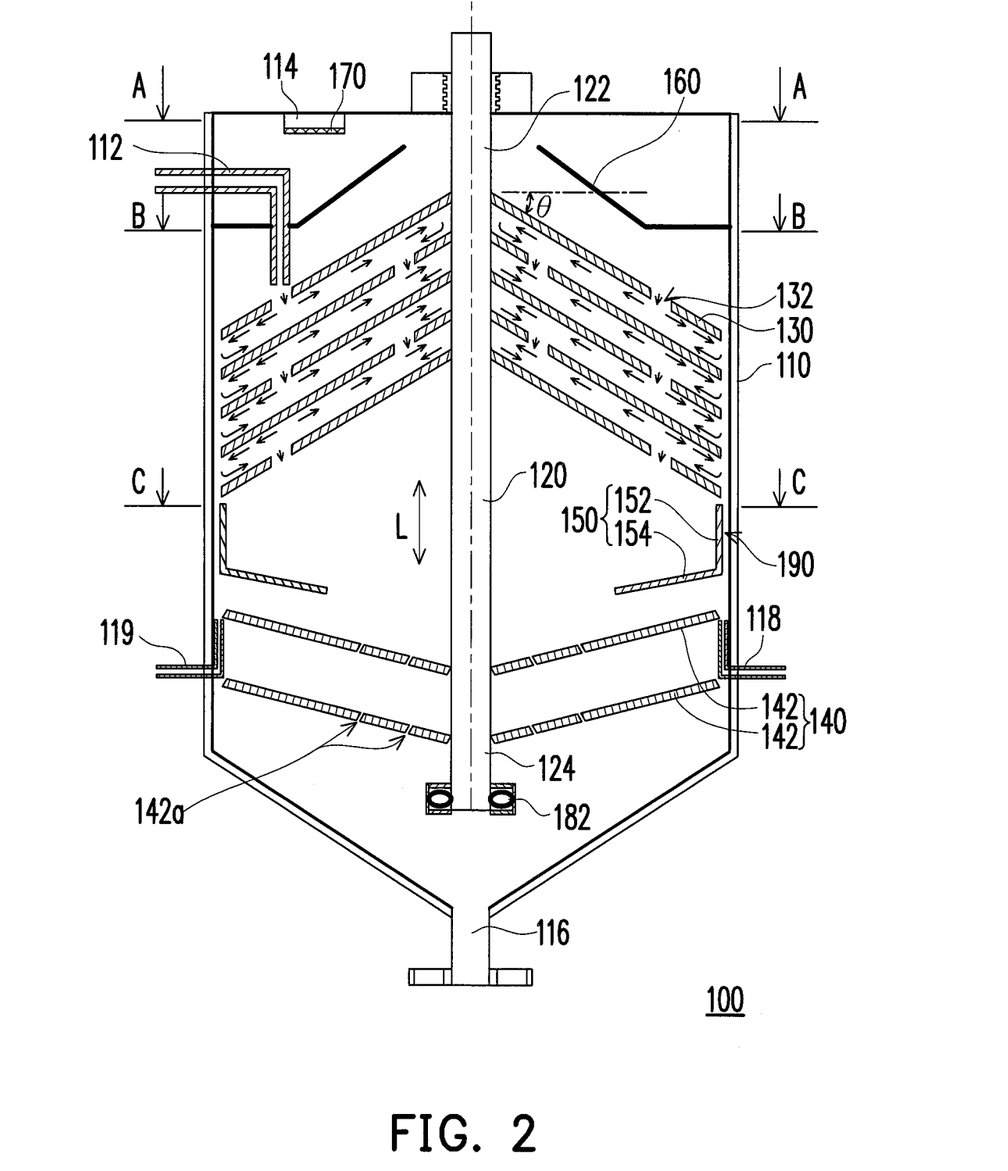
FIG. 2 is an exemplary illustration of the extraction unit depicted in FIG. 1.

FIG. 2 is an exemplary illustration of the extraction unit 100 depicted in FIG. 1. As shown in FIG. 2, the chamber 110 of the extraction unit 100 includes a shaft 120, a plurality of rotation discs 130, a depositor 140, and a guiding board 150. The shaft 120 is configured in the chamber 110 by means of a bearing set 182. An external rotor (e.g., a motor that is not shown in the drawings) is employed to rotate the rotation discs 130 and the depositor 140.

Figure 3:
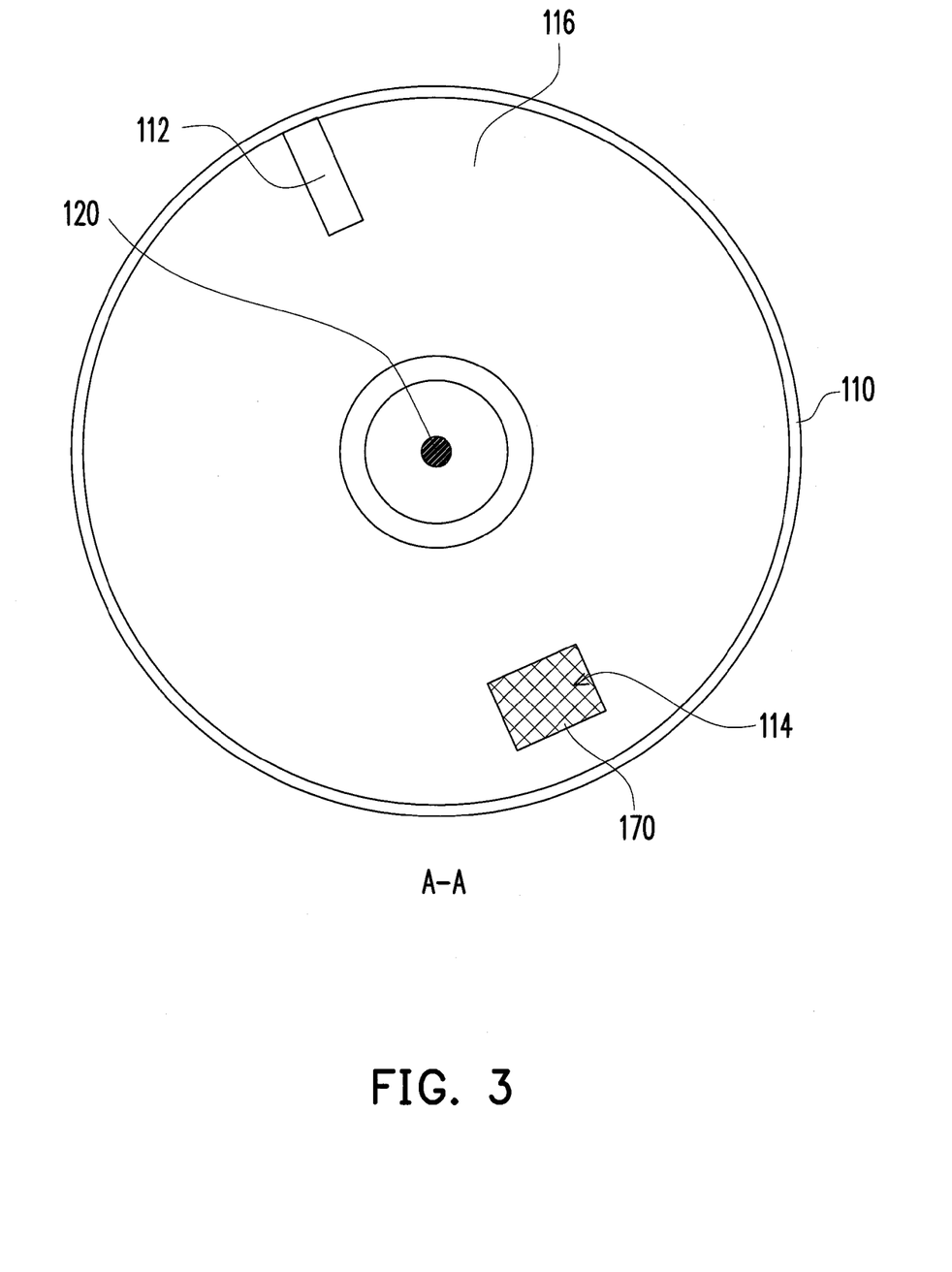
FIG. 3 to FIG. 5 are top views illustrating the extraction unit of FIG. 2 taken along an A-A plane, a B-B plane, and a C-C plane.
Figure 4:
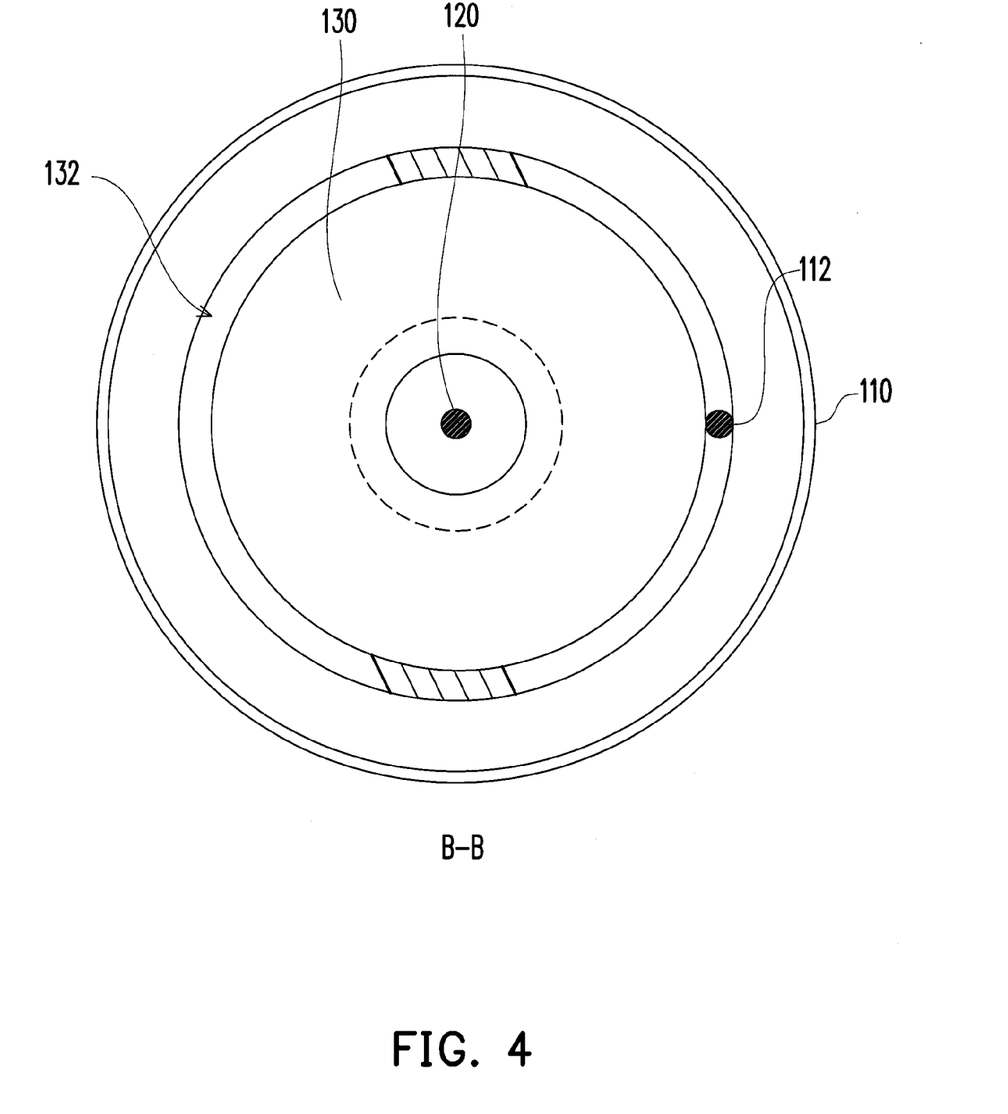
Figure 5:
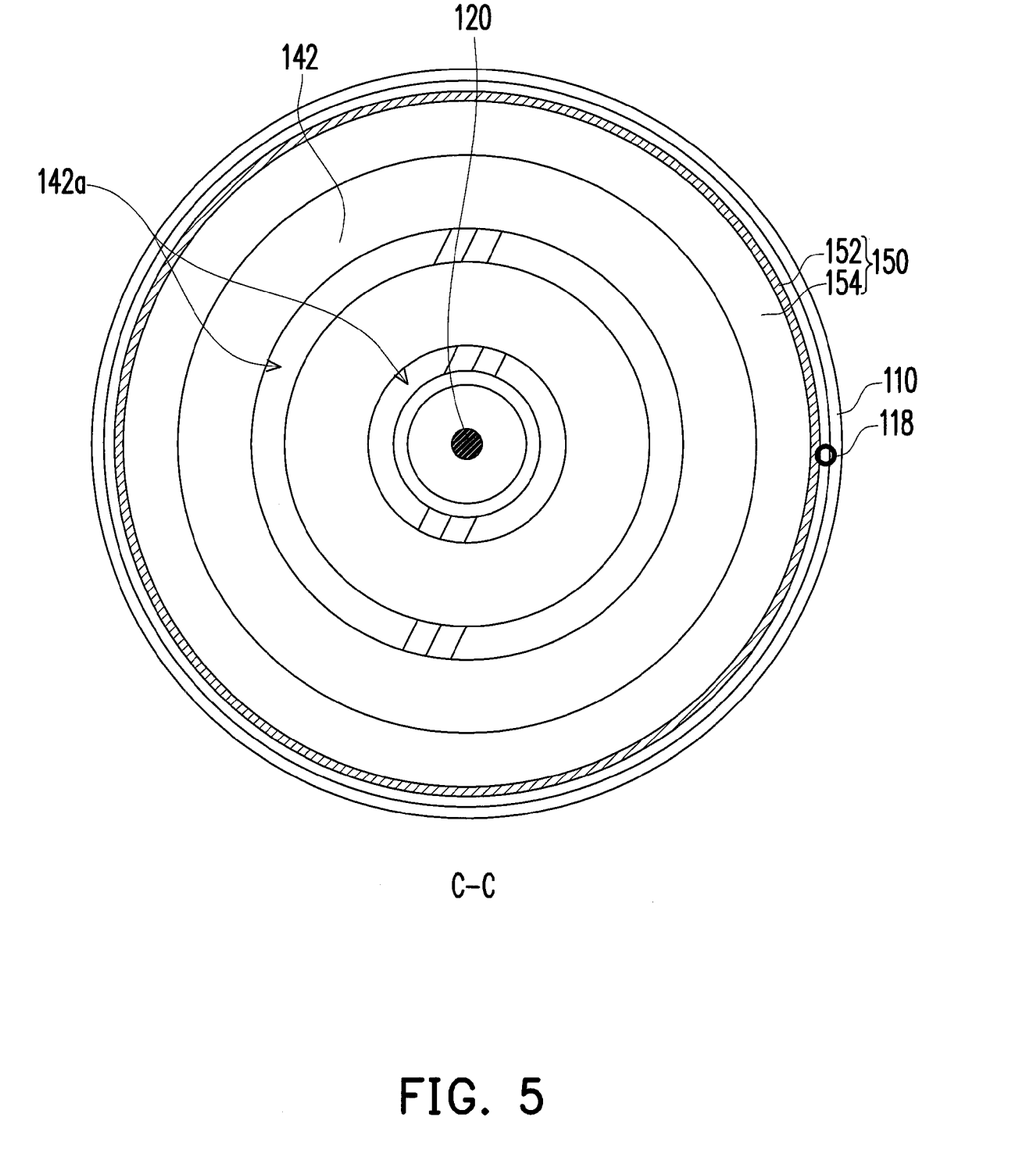

FIG. 3 to FIG. 5 are top views illustrating the extraction unit 100 of FIG. 2 taken along an A-A plane, a B-B plane, and a C-C plane.

With reference to FIG. 2 to FIG. 5, the shaft 120 has a first end 122 and a second end 124. The first end 122 is adjacent to the top of the chamber 110, and the second end 124 is adjacent to the bottom of the chamber 110. The rotation discs 130 are juxtaposed at the first end 122 of the shaft 120. Each of the rotation discs 130 has at least one opening 132. A biological substance can be introduced to the opening 132 of the uppermost rotation disc 130 through the biological substance feeding entrance 112, and the biological substance moves downward and sequentially passes through the opening 132 of each of the rotation discs 130. The extraction solvent can be injected into the chamber 110 through the extraction solvent injection entrance 118 or 119, such that the extraction solvent and the biological substance are reversely contacted to generate the extract and the raffinate.

The extract enters the separation unit 300 shown in FIG. 1 through the extract outlet 114, and a filter 170 can be configured at the extract outlet 114 for filtering impurities. A block board 160 can be configured at the top of the chamber 110, so as to prevent the backflow of the extract or prevent the raffinate from entering the extract outlet 114. Besides, the depositor 140 is configured at the second end 124 of the shaft 120 for collecting the raffinate and having the raffinate enter the residue discharge valve 800 through the raffinate outlet 116. Thereby, the residue discharge valve 800 can control the raffinate to be discharged from the chamber 110 and enter the raffinate container 500.

In this exemplary embodiment, the shaft 120 passes through a center of each of the rotation discs 130, so as to rotate the rotation discs 130. Besides, each of the rotation discs 130 inclines down in a direction from the center to the peripheries of the disc 130. The guiding board 150 is configured between the rotation discs 130 and the depositor 140. The guiding board 150 includes a first portion 152 and a second portion 154. The first portion 152 is adjacent to and parallel to an inner wall of the chamber 110, and the second portion 154 is transversely configured in the chamber 110. The first portion 152 and the inner wall of the chamber 110 constitute a channel 190, and openings at two ends of the channel 190 are respectively adjacent to the extraction solvent injection entrances 118 and 119 and the lowermost rotation disc 130. Thereby, the extraction solvent injected from the extraction solvent injection entrances 118 and 119 can flow among the rotation discs 130 through the channel 190 and can be reversely contacted to the biological substance for generating the extract and the raffinate.

The location of the opening 132 on each of the rotation discs 130 of the extraction unit 100 can be adjusted according to this exemplary embodiment, so as to improve the extraction efficiency. To be more specific, the openings 132 of two adjacent rotation discs 130 can be overlapped or not overlapped in an extension direction L of the shaft 120. If the openings 132 of two adjacent rotation discs 130 are not overlapped, it means the opening 132 of each of the rotation discs 130 is alternately arranged. The biological substance and the extraction solvent flow among the rotation discs 130 along the inclination directions of the rotation discs 130 and flow through a large portion of the area among the rotation discs 130, as shown by the arrows in FIG. 2. As such, the retention time of the biological substance in the extraction solvent is increased, which is conducive to the improvement of the extraction efficiency and the reduction of the amount of the extraction solvent.

Figure 6A:
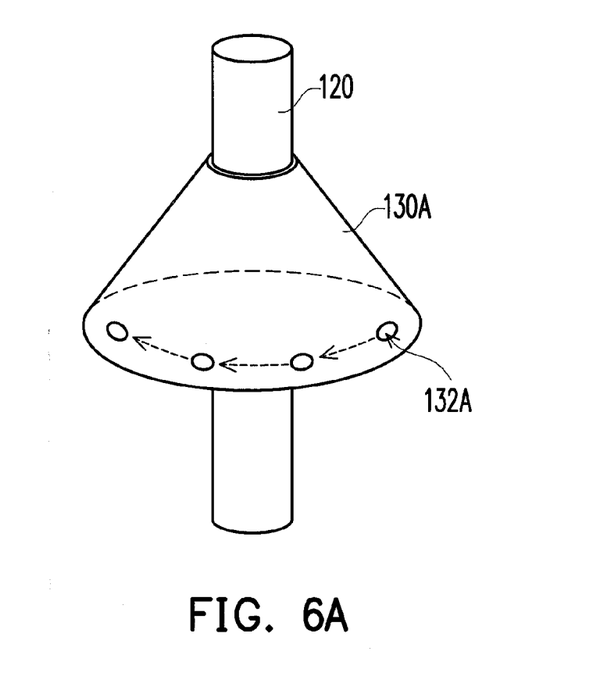
FIG. 6A to FIG. 6D respectively illustrate several types of rotation discs applicable to the extraction apparatus of the disclosure.

Several types of the rotation discs applicable to this exemplary embodiment are enumerated hereinafter. For instance, the rotation disc 130A shown in FIG. 6A is circular and has a plurality of openings 132A. The openings 132A are located at the peripheries of the rotation disc 130A. The biological substance (e.g., mashed microalgae) may flow in a direction shown by dotted arrows in FIG. 6A. When the biological substance is introduced to the peripheries of the uppermost rotation disc 130A from the biological substance injection entrance 112 shown in FIG. 2, the biological substance can directly enter another rotation disc 130A from the openings 132A located at the peripheries of the uppermost rotation disc 130A. The other biological substance not entering the openings 132A may move to the openings 132A of the next rotation disc 130A along the path shown by dotted lines or along the inner wall of the chamber 110 (as shown in FIG. 2).

Figure 6B:
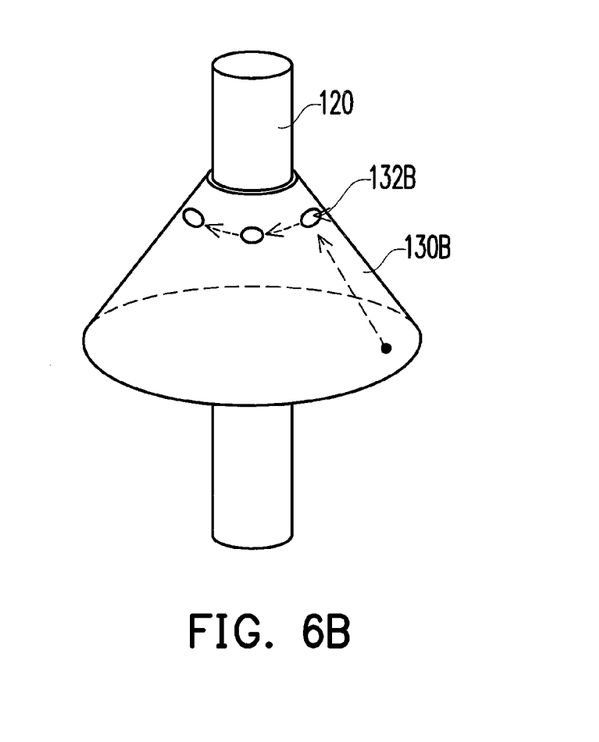

The rotation disc 130B shown in FIG. 6B is circular and has a plurality of openings 132B, for instance. The openings 132B are adjacent to the shaft 120. The biological substance (e.g., mashed microalgae) may flow in a direction shown by dotted arrows in FIG. 6B. When the biological substance is introduced to the peripheries of the uppermost rotation disc 130B from the biological substance injection entrance 112 shown in FIG. 2, the biological substance in the openings 132B of the uppermost rotation disc 130B can move to the along the radius of the rotation disc 130B and then enter the next rotation disc 130B (i.e., a lower rotation disc 130B) from the openings 132B. The other biological substance not entering the openings 132B may move to the openings 132B of the next rotation disc 130B along the path shown by dotted lines or along the inner wall of the chamber 110 (as shown in FIG. 2).

Figure 6C:
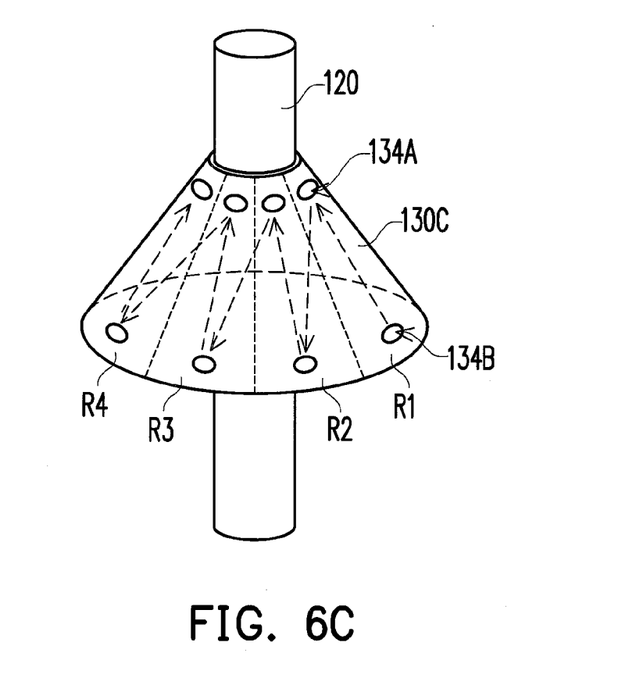

The rotation disc 130C shown in FIG. 6C is circular, for instance, and the rotation disc 130C has a plurality of equivalent radii R1~Rn. One of the first openings 134A adjacent to the shaft 120 and one of the second openings 134B located at the peripheries of the rotation disc 130C are on the same radius. The biological substance (e.g., mashed microalgae) may flow in a direction shown by dotted arrows in FIG. 6C. When the biological substance is introduced to the peripheries of the uppermost rotation disc 130C from the biological substance injection entrance 112, parts of the biological substance can directly enter the next rotation disc 130C from the second openings 134B located at the peripheries of the uppermost rotation disc 130C. Other parts of the biological substance may move to the first openings 134A located at the center of the rotation disc 130C along the radius of the rotation disc 130C and then enter the next rotation disc 130C from the first openings 134A. The other biological substance not entering the first openings 134A or the second openings 134B may continuously move along the path shown by dotted lines or along the inner wall of the chamber 110 (shown in FIG. 2) to the first openings 134A or the second openings 134B of the next rotation disc 130C.

Figure 6D:
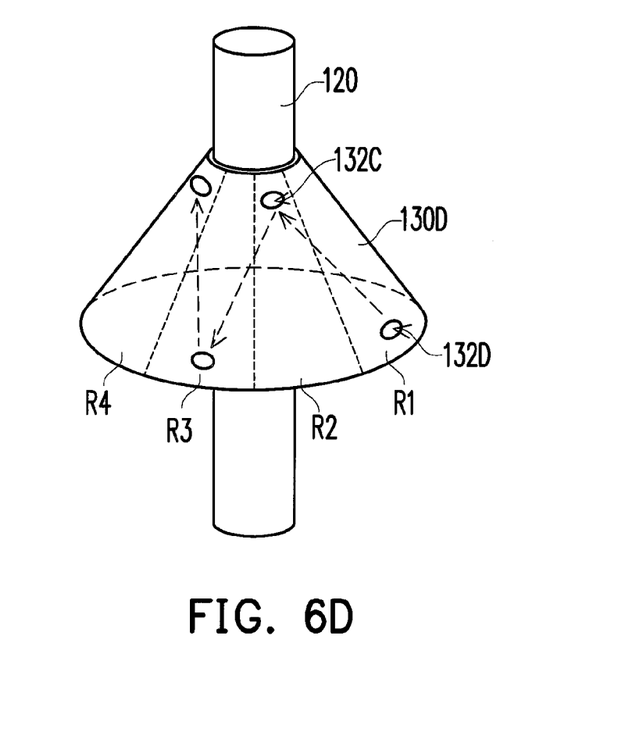

The rotation disc 130D shown in FIG. 6D is similar to the rotation disc 130C shown in FIG. 6C. Namely, the rotation disc 130D is circular and has a plurality of radii R1~Rn. The difference between rotation disc 130C and 130D which lies in the rotation disc 130D shown in FIG. 6D has only one opening 132D on the same radius. The openings 132D on the $(2M-1)^{th}$ radius (i.e., R1, R3, etc.) are located at the peripheries of the rotation disc 130D, and the openings 132C on the $2M^{th}$ radius (i.e., R2, R4, etc.) are adjacent to the shaft 120. Here, M is a positive integer. The biological substance (e.g., mashed microalgae) may flow in a direction shown by dotted arrows in FIG. 6D. When the biological substance is introduced to the peripheries of the uppermost rotation disc 130D from the biological substance injection entrance 112, parts of the biological substance can move to the first openings 132C of the rotation disc 130D along the radii of the rotation disc 130D and then enter the next rotation disc 130D from the first openings 132C. Other parts of the biological substance may directly enter the next rotation disc 130D through the second openings 132D located at the peripheries of the uppermost rotation disc 130D. Alternatively, the other biological substance not entering the first openings 132C or the second openings 132D may continuously move along the path shown by dotted lines or along the inner wall of the chamber 110 (shown in FIG. 2) to the first openings 132C or the second openings 132D of the next rotation disc 130D.

Other structural parameters of the extraction unit 100 can also be designed in the exemplary embodiment to modify the manufacturing process. For instance, a distance between two adjacent rotation discs 130 ranges from about 0.1 mm to about 10 mm. A diameter of the opening 132 of each of the rotation discs 130 ranges from about 0.1 mm to about 10 mm. A distance between the inner wall of the chamber 110 and an edge of each of the rotation discs 130 ranges from about 0.01 mm to about 10 mm. An inclined angle θ between each of the rotation discs 130 and a horizontal direction ranges from about 1° to about 90°. Certainly, the rotation discs 130 are not limited to be circular and can be shaped in other way as long as similar effects can be achieved.

Besides, given that the length of the shaft 120 in the chamber 110 of the extraction unit 100 is 400 mm, for instance, the number of the rotation discs 130 ranges from 1 to 1000. However, if the length of the shaft 120 exceeds 400 mm, the number of the rotation discs 130 may also exceed 1000. That is to say, the number of the rotation discs 130 can be determined based on the length of the shaft 120 or the distance between two adjacent rotation discs 130. In most cases, the more the rotation discs 130, the better the extraction efficiency, and the less the amount of the extraction solvent.

On the other hand, both the shear force generated by rotating the rotation discs 130 and the changeable moving speed of the rotation discs 130 and pressure can further destruction of the cell wall of the biological substance, so as to enhance the cell rupture effects and improve the extraction efficiency correspondingly.

Additionally, the second portion 154 of the guiding board 150 collects the raffinate discharged from the opening 132 of the lowermost rotation disc 130 and guides the raffinate to the underlying depositor 140. As indicated in FIG. 2, the depositor 140 of this exemplary embodiment includes a plurality of V-shaped discs 142 juxtaposed at the second end 124 of the shaft 120. The shaft 120 passes through the center of each of the V-shaped discs 142 to rotate the V-shaped discs 142. Each of the V-shaped discs 142 ascends in a direction from the center to the peripheries of the V-shaped disc 142 and has discharge holes 142a for outputting the raffinate and unnecessary water to the raffinate outlet 116 through the discharge holes 142a.

Figure 7:
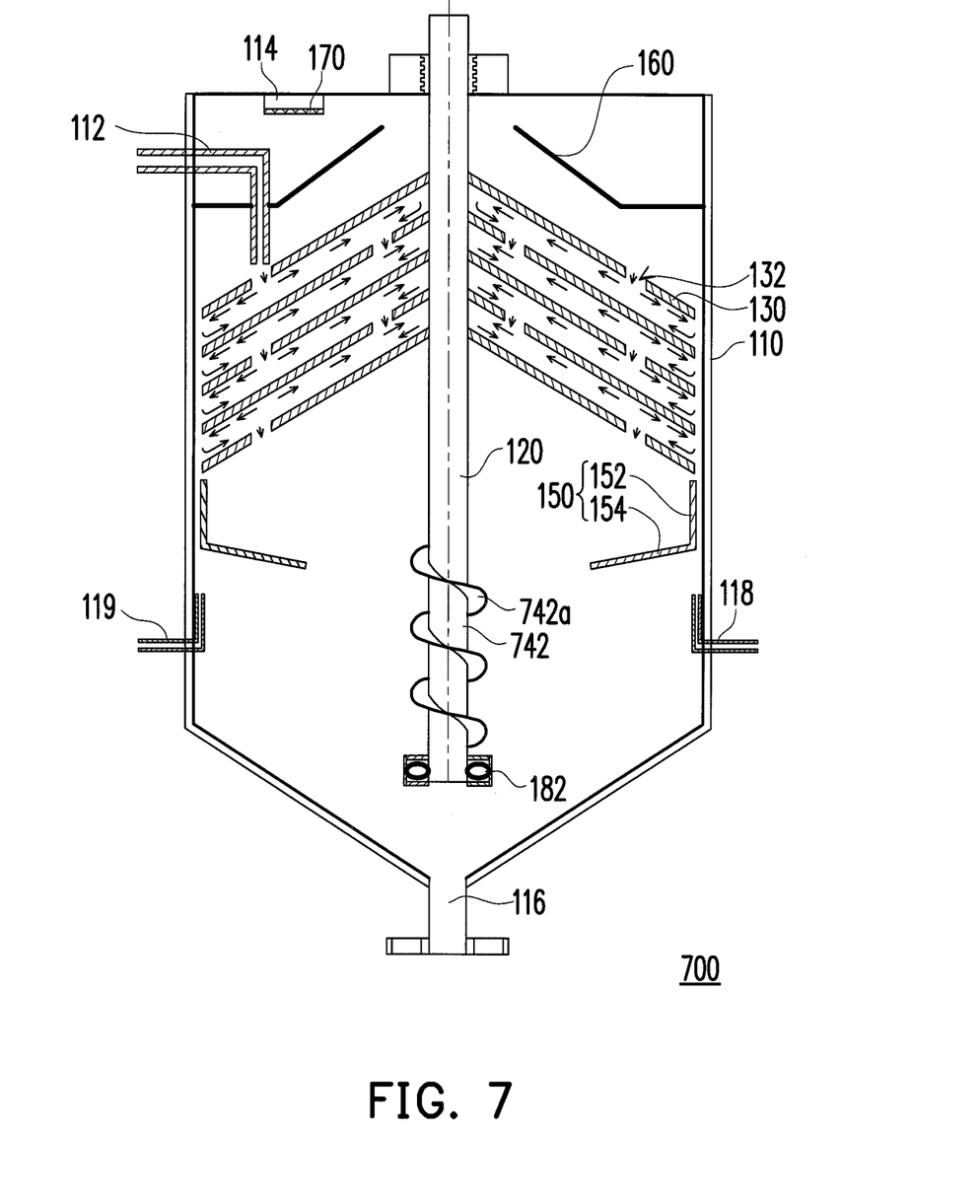
FIG. 7 is an another exemplary illustration of the extraction unit depicted in FIG. 1.

FIG. 7 is another an exemplary illustration of the extraction unit 100 depicted in FIG. 1. With reference to FIG. 7, the extraction unit 700 is similar to the extraction unit 100 shown in FIG. 1, and the same or similar elements are marked by the same numerals. The descriptions of the same or similar elements are not reiterated herein, while the difference between the two extraction units 700 and 100 lies in that extraction unit 700 has an extrusion screw 742 in replacement of the V-shaped discs 142, and the extrusion screw 742 serves as the depositor. Here, the extrusion screw 742 has a discharge thread 742a for moving the raffinate into the raffinate outlet 116.

The extraction apparatus 10 described in the previous exemplary embodiments can be applied to extract the lipids from the microalgae in the following fashion. The microalgae are introduced to the extraction unit 100 by using the feed unit 200. A cell rupture reagent including strong acid, strong alkali, a deposition solvent, and a cosolvent can be selectively added to the feed unit 200. Besides, a heat exchanger (not shown) can control the temperature at which the microalgae are introduced to the chamber 110, so as to improve the efficiency of extracting the microalgal lipids by using the extraction solvent. The microalgae are injected among the rotation discs 130 from the biological substance feeding entrance 112 and the openings 132 of the rotation discs 130 and flow among the rotation discs 130 due to the centrifugal force generated by rotating the rotation discs 130. Thereby, the microalgae can be mixed with the extraction solvent injected from the extraction solvent injection entrance 118 that is located at the bottom of the chamber 110, and the mixture can sequentially enter the lower rotation discs 130. The efficiency of extracting the microalgal lipids by using the extraction solvent can be improved because the mixture flows among the rotation discs 130. Besides, the water content of the microalgae can be separated and removed from the outer sides or the ends of the rotation discs 130 by using parts of the extraction solvent, so as to lessen the impact of the water content of the microalgae to lipids extraction.

The microalge discharged from the lowermost rotation disc 130 include water and microalgal residues. Due to the V-shaped discs 142 of the depositor (shown in FIG. 2) or the extrusion screw 742 (shown in FIG. 7), the microalge are discharged from the raffinate outlet 116 and the residue discharge valve 800 through and moved to the raffinate container 500. The separation unit 300 separates the filtered extract collected from the extract outlet 114. Owing to the changeable solubility of the microalgal lipids in the extraction solvent under different temperature or pressure, the extraction solvent can be separated from the microalgal lipids and then be recycled and re-used.

In light of the foregoing, the extraction apparatus described in the exemplary embodiments of the disclosure is capable of continuously and efficiently extracting the biological substance. Multiple rotation discs are utilized in the extraction apparatus to significantly improve the efficiency of extracting the biological substance by using the extraction solvent. Specifically, when the extraction solvent is applied to extract the lipids from the microalgae, the retention time of the microalgal lipids in the extraction solvent can be significantly increased, solubility of the microalgal lipids in the extraction solvent can be improved, and the impact of the water content of the microalge on the lipids extraction from the microalgae can be lessened. Hence, the efficiency of extracting the lipids from the microalgae by using the extraction solvent can be enhanced. On the other hand, owing to the improvement of the efficiency of extracting the lipids from the microalgae, the amount of the extraction solvent can be reduced, and production costs can be reduced.

It will be apparent to those skilled in the art that various modifications and variations can be made to the structure of the disclosed exemplary embodiments without departing from the scope or spirit of the disclosure. In view of the foregoing, it is intended that the disclosure cover modifications and variations of this disclosure provided they fall within the scope of the following claims and their equivalents.

What is claimed is:

1. An extraction apparatus having a chamber and comprising:
    a shaft having a first end and a second end, the first end being adjacent to a top of the chamber, the second end being adjacent to a bottom of the chamber;
    at least one rotation disc juxtaposed at the first end of the shaft, each of the at least one rotation disc having at least one opening, the shaft passing through a center of the each of the at least one rotation disc;
    a biological substance feeding entrance located at the top of the chamber for introducing a biological substance to the at least one opening of an uppermost rotation disc of the at least one rotation disc, such that the biological substance moves downward and sequentially passes through the at least one opening of the each of the at least one rotation disc;
    an extraction solvent injection entrance located at the bottom of the chamber, an extraction solvent being injected into the chamber through the extraction solvent injection entrance, such that the extraction solvent and the biological substance are reversely contacted to generate an extract and a raffinate;
    an extract outlet located at the top of the chamber for discharging the extract;
    a raffinate outlet located at the bottom of the chamber for discharging the raffinate; and
    a depositor configured at the second end of the shaft for collecting the raffinate and discharging the raffinate from the chamber through the raffinate outlet the depositor comprising a plurality of components coupled to and extending from the second end of the shaft or a screw thread extending from the second end of the shaft along the longitudinal axis.

2. The extraction apparatus as recited in claim 1, further comprising a feed unit connected to the biological substance feeding entrance to provide the chamber with the biological substance.

3. The extraction apparatus as recited in claim 2, wherein the feed unit comprises a cell rupture apparatus for rupturing a cell wall of the biological substance.

4. The extraction apparatus as recited in claim 3, wherein the cell rupture apparatus comprises a high-pressure homogenizer or a ball miller.

5. The extraction apparatus as recited in claim 2, wherein the feed unit comprises a high-pressure homogenizer or an extruder.

6. The extraction apparatus as recited in claim 1, further comprising a separation unit connected to the extract outlet for collecting the extract and the extraction solvent, separating the extract from the extraction solvent, and recycling the extraction solvent and moving the extraction solvent to the chamber for re-use.

7. The extraction apparatus as recited in claim 1, wherein the each of the at least one rotation disc inclines down in a direction from the center to peripheries of the each of the at least one rotation disc.

8. The extraction apparatus as recited in claim 1, wherein the depositor comprises a plurality of V-shaped discs juxtaposed at the second end of the shaft, the shaft passes through a center of each of the V-shaped discs, and the each of the V-shaped discs ascends in a direction from a center to peripheries of the each of the V-shaped discs and has at least one discharge hole for discharging the raffinate.

9. The extraction apparatus as recited in claim 1, wherein the depositor comprises an extrusion screw, and the extrusion screw has a discharge thread for moving the raffinate into the raffinate outlet.

10. The extraction apparatus as recited in claim 1, further comprising a guiding board configured between the at least one rotation disc and the depositor, the guiding board comprising a first portion and a second portion, the first portion being adjacent to and parallel to an inner wall of the chamber, the second portion being transversely configured in the chamber, wherein the first portion and the inner wall of the chamber constitute a channel, openings at two ends of the channel are respectively adjacent to the extraction solvent injection entrance and a lowermost rotation disc of the at least one rotation disc, such that the extraction solvent injected from the extraction solvent injection entrance flows among the at least one rotation disc through the channel, and the second portion of the guiding board is capable of collecting the raffinate discharged from the at least one opening of the lowermost rotation disc and guiding the raffinate to the depositor.

11. The extraction apparatus as recited in claim 1, wherein the at least one rotation disc refers to a plurality of the rotation discs, and the openings of two adjacent rotation discs of the rotation discs do not overlap in an extension direction of the shaft.

12. The extraction apparatus as recited in claim 1, wherein the at least one rotation disc refers to a plurality of the rotation discs, and a distance between two adjacent rotation discs of the rotation discs ranges from about 0.1 mm to about 10 mm.

13. The extraction apparatus as recited in claim 1, wherein a diameter of the at least one opening of the each of the at least one rotation disc ranges from about 0.1 mm to about 10 mm.

14. The extraction apparatus as recited in claim 1, wherein a distance between an inner wall of the chamber and an edge of the at least one rotation disc ranges from about 0.01 mm to about 10 mm.

15. The extraction apparatus as recited in claim 1, wherein the number of the at least one rotation disc ranges from 1 to 1000.

16. The extraction apparatus as recited in claim 7, wherein an inclined angle between the each of the at least one rotation disc and a horizontal direction ranges from about 1° to about 90°.

17. The extraction apparatus as recited in claim 1, wherein the at least one opening of the each of the at least one rotation disc comprises a plurality of openings located at peripheries of the each of the at least one rotation disc.

18. The extraction apparatus as recited in claim 1, wherein the at least one opening of the each of the at least one rotation disc comprises a plurality of openings adjacent to the shaft.

19. The extraction apparatus as recited in claim 1, wherein the each of the at least one rotation disc is circular and has a plurality of equivalent radii, the at least one opening comprises a plurality of first openings and a plurality of second openings, the first openings are adjacent to the shaft, the second openings are located at peripheries of the each of the at least one rotation disc, and one of the first openings and one of the second openings are on a same one of the radii.

20. The extraction apparatus as recited in claim 1, wherein the each of the at least one rotation disc is circular and has a plurality of equivalent radii, the at least one opening comprises a plurality of openings, one of the openings on a $(2M-1)^{th}$ radius of the radii is located at peripheries of the each of the at least one rotation disc, one of the openings on a $2M^{th}$ radius of the radii is adjacent to the shaft, and M is a positive integer.

* * * * *